July 3, 1928. Re. 17,020

L. J. D. HEALY

PAVING BLOCK

Original Filed Aug. 5 1921

INVENTOR:
LEON J. D. HEALY

BY

Edwin B. H. Tower Jr. ATTY.

Reissued July 3, 1928.

Re. 17,020

UNITED STATES PATENT OFFICE.

LEON J. D. HEALY, OF MILWAUKEE, WISCONSIN, ASSIGNOR TO WRIGHT RUBBER PRODUCTS COMPANY, OF RACINE, WISCONSIN, A CORPORATION OF WISCONSIN.

PAVING BLOCK.

Original No. 1,473,767, dated November 13, 1923, Serial No. 490,038, filed August 5, 1921. Application for reissue filed February 2, 1925. Serial No. 6,469.

This invention relates to a paving block.

The object of the invention is to provide the block with flanges and recesses which will interlock it in horizontal alinement with its adjoining blocks, and which will require particular sides of adjacent blocks to be placed together.

The blocks provided by this invention are particularly advantageous for pavements or other surface coverings in which the blocks have to be arranged in a prescribed manner to form a particular design on the surface of the pavement.

The accompanying drawing illustrates a block embodying the invention, and the views therein are as follows.

Figure 1:
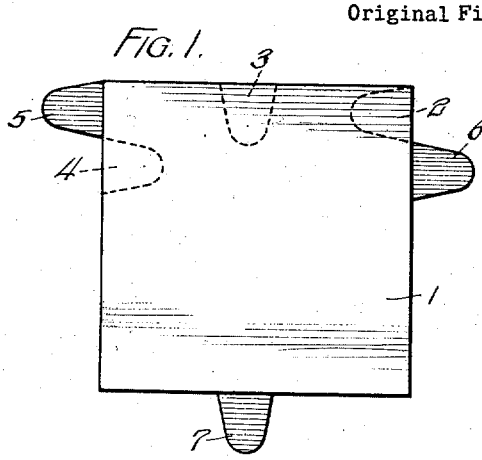
Fig. 1 is a top plan view of a paving block.
Figure 2:
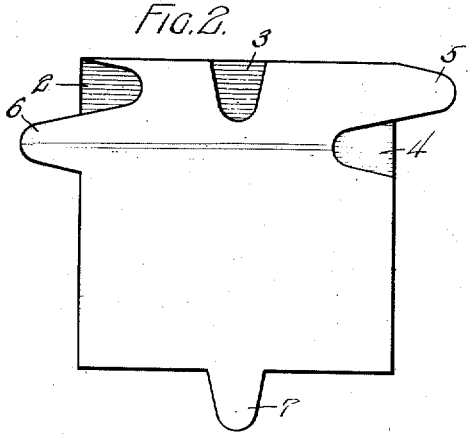
Fig. 2 is a bottom plan view thereof.

The block illustrated in the drawings comprises a substantially rectangular member 1 of rubber. It may, of course, be made in other forms and of other material.

The member is shown as having recesses or depressions 2, 3 and 4 open at the bottom thereof arranged in three of its edges. Of course, a different number of recesses or depressions may be used and they may also be arranged in all or a less number of the edges of the member.

The depth of the depressions or recesses is less than the thickness of the member itself.

A plurality of projecting fingers 5, 6 and 7 are formed on the member. These projections are complementary to the recesses or depressions.

The projecting finger of one member will, therefore, fit into the recesses or depressions of another member arranged adjacent thereto. The bottom surfaces of these projecting fingers and of the members are in the same plane.

The marginal edges of the upper surface of the member are in the same planes with and directly over the marginal edges of the lower surface of the member throughout the greater portion of their extent. The upper and lower portions of the member are, therefore, substantially coextensive.

When the blocks are being laid, one of them is so placed that the bottom surface of its projecting finger lies flat along the surface to be covered.

In order that each member may be held in place on the surface which it covers, nails, screws or other fastening means 8 may extend through the projecting fingers and into the floor, wall, roadway or other place being covered thereby.

After one block has been securely fastened, another one may be arranged alongside so that the finger thereof enters the recess of the member already fastened and a finger of the member already fastened fits into a recess of the member being arranged in place.

Ordinarily, when laying the blocks, fastening means are provided for only two of the projecting fingers of each block, as one finger of the one being arranged in place must be inserted in a recess of the adjacent one already laid.

Thus, if laying the blocks from left to right, no fastening means would be provided for finger 5, while if laying from right to left, no fastening means would be provided for finger 6.

As the blocks are being laid, the edges of adjacent blocks may be cemented together so as to prevent water or other liquid seeping down between the same.

Figure 3:
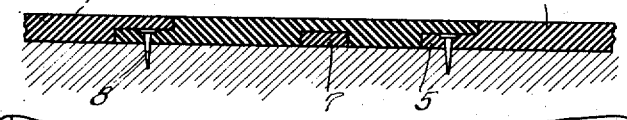
Fig. 3 is a transverse section showing a number of the blocks applied to a surface to be covered thereby.
Figure 4:
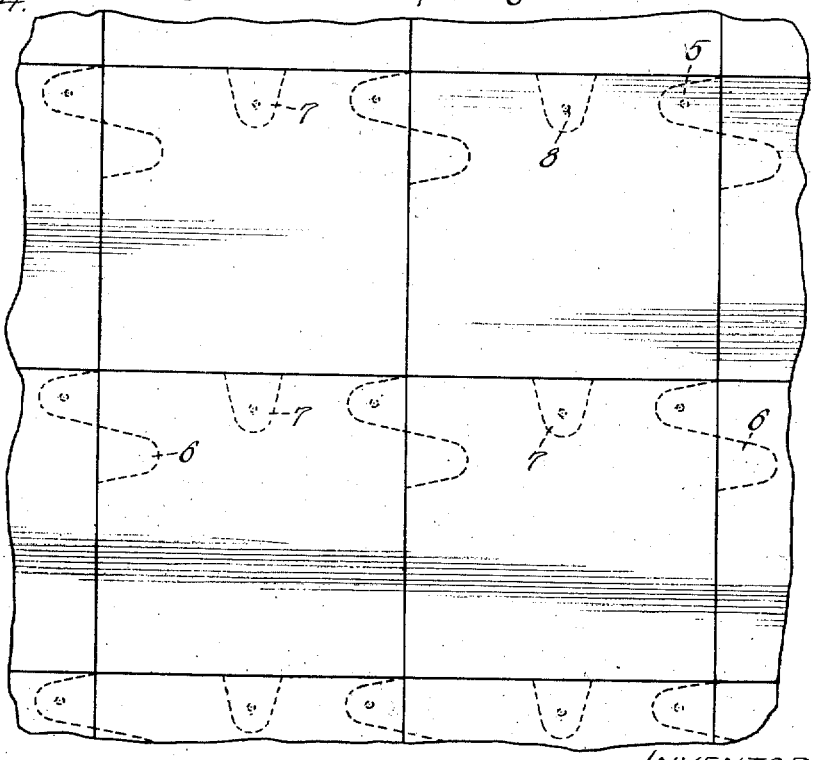
Fig. 4 is a top plan view of a surface covered or paved with the blocks.

Figs. 3 and 4 show a surface covered by a number of the blocks. It will be noted that the exposed surfaces of the blocks entirely cover the fingers and cooperating recesses which form the interlocking means therebetween.

Therefore, the exposed surface of the covering or paving is free from any projections by which the blocks might become dislodged or displaced.

It will be further noted that in laying the blocks, every one occupies the same relative position with respect to the adjacent one.

The corresponding fingers and recesses extend in the same direction and similar elements of the blocks are arranged in parallel relation.

The invention contained herein is, of course, susceptible of other embodiments and adaptations.

What I claim is:

1. A paving block comprising a substantially rectilinear body having a finger projecting from each of the opposite edges thereof in asymmetrical arrangement, and a correspondingly shaped and positioned recess on the edge opposite said finger, all being offset from the medial line.

2. A paving block comprising a substantially rectilinear body having a finger projecting from each of the opposite edges thereof in asymmetrical arrangement and offset from the medial line of said body, and a correspondingly shaped and positioned recess in the side opposite each of said fingers, both fingers and recesses lying entirely below the plane of the obverse side of said block.

3. A paving block comprising a substantially rectilinear body having a finger projecting from each of the opposite edges thereof in asymmetrical arrangement, a correspondingly shaped and positioned recess in the edge opposite said finger, said recess and finger being offset from the medial line, another finger projecting from one of the other edges, and a recess located on the remaining edge opposite thereto and in alinement with said finger.

4. A paving block comprising a substantially rectilinear body having a finger projecting from each of the opposite edges thereof in asymmetrical arrangement, a correspondingly shaped and positioned recess in the edge opposite each finger, said recess and finger being offset from the medial line of said body, another finger projecting from one of the other edges, and a recess located in the remaining edge and being opposite thereto and in alinement with said finger, said fingers and recess lying entirely below the plane of the observe side of said block.

5. A paving block comprising a substantially rectilinear body having a finger projecting from one edge thereof, and a correspondingly shaped and positioned recess in the opposite edge, both being offset from the medial line of said body, said finger and recess being each substantially one half the thickness of said block.

6. A paving block comprising a substantially rectilinear body having a finger projecting from each of the opposite edges thereof in asymmetrical arrangement, a correspondingly shaped and positioned recess in the edge opposite each of said fingers, said finger and recess being offset from the medial line, another finger projecting from one of the other edges, and a recess located on the remaining edge and being opposite thereto and in alinement with said finger, said fingers and recesses lying entirely below the plane of the obverse side of said block, said fingers and recesses being substantially one half the thickness of said block.

7. A paving or covering block comprising a block having recesses in the edges thereof, and correspondingly shaped fingers projecting from the edges thereof, some of said edges having both projections and recesses and others of said edges having only projections or recesses, the depth of the recesses and the thickness of the fingers being less than the thickness of the block, whereby when two similar blocks are arranged side by side the projection of one enters the recess of the other and locks the blocks together.

8. A paving or covering block having recesses in two opposite edges thereof and corresponding fingers projecting from such edges, the recesses and projections being located near one end of the unit, a recess only in another edge thereof, and a corresponding finger in the edge opposite thereto, all of the recesses being open at the bottom of the unit, and the recesses and projections being less in depth and thickness respectively than the thickness of the unit so that when a plurality of such units are arranged edge to edge with the fingers locked into the corresponding recesses the fingers of one unit are covered by the adjacent units.

LEON J. D. HEALY.